(12) United States Patent
Ferguson et al.

(10) Patent No.: US 11,507,102 B2
(45) Date of Patent: *Nov. 22, 2022

(54) ACTIVELY MODIFYING A FIELD OF VIEW OF AN AUTONOMOUS VEHICLE IN VIEW OF CONSTRAINTS

(71) Applicant: Waymo LLC, Mountain View, CA (US)

(72) Inventors: David I. Ferguson, San Francisco, CA (US); Jiajun Zhu, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 85 days.

This patent is subject to a terminal disclaimer.

(21) Appl. No.: 16/588,746

(22) Filed: Sep. 30, 2019

(65) Prior Publication Data

US 2020/0033873 A1 Jan. 30, 2020

Related U.S. Application Data

(63) Continuation of application No. 15/675,857, filed on Aug. 14, 2017, now Pat. No. 10,466,712, which is a (Continued)

(51) Int. Cl.
*G05D 1/02* (2020.01)
*G08G 1/16* (2006.01)
*B60R 1/00* (2022.01)

(52) U.S. Cl.
CPC .......... *G05D 1/0231* (2013.01); *B60R 1/00* (2013.01); *G05D 1/0214* (2013.01); *G08G 1/167* (2013.01);
(Continued)

(58) Field of Classification Search
CPC .... G05D 1/0231; G05D 1/0214; G08G 1/167; B60R 1/00; B60R 2300/307; B60R 2300/301; B60R 2300/302
See application file for complete search history.

(56) References Cited

U.S. PATENT DOCUMENTS 5,187,664 A * 2/1993 Yardley ................ G05D 1/0265
 180/167
5,227,748 A * 7/1993 Sroka ..................... H01P 1/202
 333/207
(Continued)

FOREIGN PATENT DOCUMENTS

DE 102006052779 A1 5/2008
JP 07-009886 A 1/1995
(Continued)

OTHER PUBLICATIONS

PCT International Search Report and Written Opinion, PCT International Application No. PCT/US2013/026917, dated Jun. 17, 2013.
(Continued)

*Primary Examiner* — Dale W Hilgendorf
(74) *Attorney, Agent, or Firm* — McDonnell Boehnen Hulbert & Berghoff LLP

(57) ABSTRACT

Methods and devices for actively modifying a field of view of an autonomous vehicle in view of constraints are disclosed. In one embodiment, an example method is disclosed that includes causing a sensor in an autonomous vehicle to sense information about an environment in a first field of view, where a portion of the environment is obscured in the first field of view. The example method further includes determining a desired field of view in which the portion of the environment is not obscured and, based on the desired field of view and a set of constraints for the vehicle, determining a second field of view in which the portion of the environment is less obscured than in the first field of view. The example method further includes modifying a position of the vehicle, thereby causing the sensor to sense information in the second field of view.

17 Claims, 11 Drawing Sheets

Related U.S. Application Data continuation of application No. 13/423,143, filed on Mar. 16, 2012, now Pat. No. 9,760,092.

(52) U.S. Cl.
CPC ... *B60R 2300/301* (2013.01); *B60R 2300/302* (2013.01); *B60R 2300/307* (2013.01)

(56) References Cited

U.S. PATENT DOCUMENTS

| | | | | |
|---|---|---|---|---|
| 5,410,346 A * | 4/1995 | Saneyoshi | | H04N 13/167 348/116 |
| 5,548,516 A * | 8/1996 | Gudat | | G01S 19/46 701/23 |
| 5,605,099 A * | 2/1997 | Sroka | | E01B 35/08 104/2 |
| 5,610,815 A * | 3/1997 | Gudat | | G05D 1/028 701/23 |
| 5,615,116 A * | 3/1997 | Gudat | | G08G 1/202 701/23 |
| 5,670,935 A * | 9/1997 | Schofield | | B60S 1/0844 340/461 |
| 6,151,539 A * | 11/2000 | Bergholz | | G01S 17/931 701/25 |
| 6,198,386 B1 | 3/2001 | White, II | | |
| 6,208,916 B1 * | 3/2001 | Hori | | G05D 1/0246 701/28 |
| 6,363,632 B1 | 4/2002 | Stentz et al. | | |
| 6,516,273 B1 * | 2/2003 | Pierowicz | | G08G 1/16 701/301 |
| 6,643,578 B2 * | 11/2003 | Levine | | G07C 5/008 701/70 |
| 6,691,015 B1 * | 2/2004 | Levine | | G08G 1/22 701/70 |
| 6,721,644 B2 * | 4/2004 | Levine | | B60K 28/16 701/70 |
| 7,072,764 B2 * | 7/2006 | Donath | | G01C 21/26 340/995.18 |
| 7,079,923 B2 * | 7/2006 | Abramson | | A47L 5/22 180/167 |
| 7,106,365 B1 * | 9/2006 | Sogawa | | H04N 13/239 348/222.1 |
| 7,196,305 B2 * | 3/2007 | Shaffer | | B60S 1/08 250/208.1 |
| 7,598,889 B2 * | 10/2009 | Maeda | | G09B 19/167 340/439 |
| 7,706,917 B1 * | 4/2010 | Chiappetta | | H02J 50/10 700/245 |
| 7,734,275 B2 * | 6/2010 | Kubota | | G08G 1/096758 455/344 |
| 7,734,387 B1 | 6/2010 | Young et al. | | |
| 7,804,980 B2 * | 9/2010 | Sasaki | | G06V 20/56 382/103 |
| 7,979,174 B2 * | 7/2011 | Fregene | | B60W 30/16 701/23 |
| 8,036,775 B2 * | 10/2011 | Matsumoto | | G06N 3/008 700/253 |
| 8,050,863 B2 * | 11/2011 | Trepagnier | | G01S 17/931 701/514 |
| 8,081,794 B2 * | 12/2011 | Stiegler | | G06T 7/20 382/100 |
| 8,139,109 B2 * | 3/2012 | Schmiedel | | G05D 1/0251 348/118 |
| 8,179,241 B2 * | 5/2012 | Sakai | | G08G 1/164 340/436 |
| 8,195,394 B1 * | 6/2012 | Zhu | | G08G 1/096725 701/514 |
| 8,457,827 B1 * | 6/2013 | Ferguson | | B60W 30/095 701/23 |
| 8,521,352 B1 * | 8/2013 | Ferguson | | G05D 1/0212 701/25 |
| 8,547,298 B2 * | 10/2013 | Szczerba | | G01S 13/867 345/7 |
| 8,589,014 B2 * | 11/2013 | Fairfield | | G05D 1/0246 701/28 |
| 8,842,176 B2 * | 9/2014 | Schofield | | H04N 7/18 348/113 |
| 8,908,035 B2 | 12/2014 | Russ et al. | | |
| 9,511,711 B2 * | 12/2016 | Petrillo | | B60R 1/00 |
| 9,760,092 B2 * | 9/2017 | Ferguson | | G05D 1/0214 |
| 10,466,712 B2 * | 11/2019 | Ferguson | | G05D 1/0231 |
| 10,525,884 B2 * | 1/2020 | Petrillo | | B60Q 1/0023 |
| 10,896,335 B2 * | 1/2021 | Herman | | G06V 40/103 |
| 11,294,390 B2 | 4/2022 | Ferguson et al. | | |
| 2002/0016653 A1 * | 2/2002 | Levine | | B60K 31/00 701/1 |
| 2003/0014176 A1 * | 1/2003 | Levine | | G08G 1/22 701/70 |
| 2003/0137517 A1 * | 7/2003 | Kondo | | G06T 15/205 345/474 |
| 2003/0227424 A1 * | 12/2003 | Lynch | | B60R 1/00 345/7 |
| 2004/0073368 A1 * | 4/2004 | Gonzalez-Banos | | G05D 1/12 701/301 |
| 2005/0033505 A1 * | 2/2005 | Zatz | | G08G 1/0962 701/117 |
| 2005/0280707 A1 | 12/2005 | Sablak et al. | | |
| 2007/0027612 A1 | 2/2007 | Barfoot et al. | | |
| 2007/0030212 A1 * | 2/2007 | Shibata | | G06T 5/50 345/9 |
| 2007/0100498 A1 * | 5/2007 | Matsumoto | | G06N 3/008 700/245 |
| 2007/0115357 A1 * | 5/2007 | Stein | | B60S 1/0844 348/148 |
| 2007/0122771 A1 * | 5/2007 | Maeda | | G09B 19/167 434/62 |
| 2007/0291130 A1 * | 12/2007 | Broggi | | G01S 17/931 348/218.1 |
| 2008/0012726 A1 * | 1/2008 | Publicover | | G08G 1/096791 340/932 |
| 2008/0027591 A1 * | 1/2008 | Lenser | | G05D 1/0251 701/2 |
| 2008/0197997 A1 * | 8/2008 | Vitito | | B60Q 1/50 340/461 |
| 2008/0215231 A1 * | 9/2008 | Breed | | G08G 1/161 701/117 |
| 2009/0015675 A1 | 1/2009 | Yang | | |
| 2009/0088916 A1 * | 4/2009 | Elgersma | | G05D 1/106 701/23 |
| 2009/0140881 A1 * | 6/2009 | Sakai | | B60R 1/00 340/901 |
| 2009/0237269 A1 * | 9/2009 | Okugi | | G08G 1/163 340/901 |
| 2010/0063651 A1 | 3/2010 | Anderson | | |
| 2010/0117812 A1 * | 5/2010 | Laubinger | | G08G 1/168 340/435 |
| 2010/0118146 A1 * | 5/2010 | Schofield | | B60R 1/00 348/148 |
| 2010/0134264 A1 | 6/2010 | Nagamine et al. | | |
| 2010/0215250 A1 * | 8/2010 | Zhu | | G06F 16/29 382/154 |
| 2010/0228427 A1 * | 9/2010 | Anderson | | G08G 1/166 701/31.4 |
| 2010/0228482 A1 * | 9/2010 | Yonak | | G01S 7/52001 701/301 |
| 2010/0245575 A1 | 9/2010 | Mori et al. | | |
| 2010/0253540 A1 * | 10/2010 | Seder | | G06V 20/58 340/905 |
| 2010/0321500 A1 | 12/2010 | Cornett et al. | | |
| 2011/0046784 A1 * | 2/2011 | Anderson | | G05D 1/0251 700/259 |
| 2011/0090073 A1 * | 4/2011 | Ozaki | | G08G 1/167 340/435 |
| 2011/0102195 A1 * | 5/2011 | Kushi | | G08G 1/096783 340/905 |
| 2011/0153166 A1 * | 6/2011 | Yester | | B60W 30/18154 701/45 |

(56) References Cited

U.S. PATENT DOCUMENTS

| | | |
|---|---|---|
| 2011/0175752 A1 | 7/2011 | Augst |
| 2011/0231061 A1* | 9/2011 | Reeve ................. A01B 79/005 |
| | | 701/41 |
| 2011/0280026 A1* | 11/2011 | Higgins-Luthman .... B60Q 1/08 |
| | | 362/466 |
| 2011/0291859 A1* | 12/2011 | Kreis ............... G08G 1/096758 |
| | | 340/905 |
| 2012/0083960 A1* | 4/2012 | Zhu .......................... B60T 8/17 |
| | | 701/23 |
| 2012/0101680 A1* | 4/2012 | Trepagnier ........... G05D 1/0214 |
| | | 701/26 |
| 2012/0166072 A1* | 6/2012 | Tamaoki ......... B60W 30/18154 |
| | | 701/300 |
| 2012/0218125 A1* | 8/2012 | Demirdjian ............ G08G 1/164 |
| | | 340/905 |
| 2012/0268262 A1* | 10/2012 | Popovic ................. G08G 1/166 |
| | | 340/438 |
| 2012/0310466 A1* | 12/2012 | Fairfield .............. G05D 1/0246 |
| | | 701/28 |
| 2012/0327188 A1 | 12/2012 | Takemura et al. |
| 2013/0033602 A1* | 2/2013 | Quast ........................ B60R 1/00 |
| | | 348/148 |
| 2013/0181823 A1* | 7/2013 | Stahlin .................. G08G 1/166 |
| | | 340/436 |
| 2013/0197736 A1* | 8/2013 | Zhu ...................... G05D 1/0088 |
| | | 701/26 |
| 2013/0245877 A1* | 9/2013 | Ferguson ............... G08G 1/167 |
| | | 701/23 |
| 2013/0253754 A1* | 9/2013 | Ferguson ............. G05D 1/0231 |
| | | 701/28 |
| 2013/0325241 A1* | 12/2013 | Lombrozo ............. G01C 21/30 |
| | | 701/23 |
| 2015/0274074 A1 | 10/2015 | Petrillo et al. |
| 2018/0024567 A1* | 1/2018 | Ferguson ............... G08G 1/167 |
| | | 701/23 |
| 2020/0026303 A1* | 1/2020 | Ferguson .................. B60R 1/00 |
| 2020/0327810 A1* | 10/2020 | Branson ............. H04N 5/23299 |
| 2020/0357139 A1* | 11/2020 | Lu .......................... B60Q 1/085 |

FOREIGN PATENT DOCUMENTS

| | | |
|---|---|---|
| JP | 2006293976 A | 10/2006 |
| JP | 2010152545 A | 7/2010 |
| WO | 2011048597 A1 | 4/2011 |

OTHER PUBLICATIONS

European Patent Office, Supplementary European Search Report dated Dec. 1, 2015, issued in connection with EP Application No. 13760269, 5 pages.

Kim et al., "User-Centered Approach to Path Planning of Cleaning Robots: Analyzing User's Cleaning Behavior", Proceedings of the ACM/IEEE international conference on Human-robot interaction, 2007.

Seo et al., "A Perception Mechanism for Supporting Autonomous Intersection Handling in Urban Driving", 2008 IEEE/RSJ International Conference on Intelligent Robots and Systems, pp. 1830-1835.

* cited by examiner

| CONSTRAINT | VALUE | WEIGHTING |
|---|---|---|
| Speed | 35 – 45 MPH | 100 |
| Crosswalk Proximity | > 6 IN | 65 |
| Other-Automobile Proximity | > 18 IN | 80 |
| Deceleration | < 4.8 FT / $S^2$ | 20 |

FIG. 2

ACTIVELY MODIFYING A FIELD OF VIEW OF AN AUTONOMOUS VEHICLE IN VIEW OF CONSTRAINTS

CROSS-REFERENCE TO RELATED APPLICATIONS

This application is a continuation of U.S. patent application Ser. No. 15/675,857, filed Aug. 14, 2017, which is a continuation of U.S. patent application Ser. No. 13/423,143, filed Mar. 16, 2012. The foregoing applications are incorporated herein by reference.

BACKGROUND

Some vehicles are configured to operate in an autonomous mode in which the vehicle navigates through an environment with little or no input from a driver. Such a vehicle typically includes one or more sensors that are configured to sense information about the environment. The vehicle may use the sensed information to navigate through the environment. For example, if the sensors sense that the vehicle is approaching an obstacle, the vehicle may navigate around the obstacle.

SUMMARY

In one aspect, an example method is disclosed that includes maintaining a set of constraints for a vehicle, causing a sensor in the vehicle to sense information in a first field of view, and determining a desired field of view, where the desired field of view is different than the first field of view. The example method further includes, based on the desired field of view and the set of constraints, determining a second field of view, where the second field of view is different than the first field of view, and causing the sensor to sense information in the second field of view.

In another aspect, a non-transitory computer-readable medium is disclosed having stored therein instructions executable by a computing device to cause the computing device to perform the example method described above.

In yet another aspect, an example vehicle is disclosed that includes a sensor, at least one processor, and data storage comprising a set of constraints for the vehicle and instructions. The instructions may be executable by the at least one processor to maintain the set of constraints for the vehicle, cause the sensor to sense information in a first field of view, and determine a desired field of view, where the desired field of view is different than the first field of view. The instructions may be further executable by the at least one processor to determine, based on the desired field of view and the set of constraints, a second field of view, where the second field of view is different than the first field of view, and cause the sensor to sense information in the second field of view.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 2 illustrates example constraints for a vehicle, in accordance with an embodiment.

DETAILED DESCRIPTION

The following detailed description describes various features and functions of the disclosed systems and methods with reference to the accompanying figures. In the figures, similar symbols typically identify similar components, unless context dictates otherwise. The illustrative system and method embodiments described herein are not meant to be limiting. It will be readily understood that certain aspects of the disclosed systems and methods can be arranged and combined in a wide variety of different configurations, all of which are contemplated herein.

A vehicle, such as a vehicle configured to operate autonomously, may include a sensor that is configured to sense information about an environment surrounding the vehicle. The sensor may have a first field of view.

At some point, the vehicle may detect that the first field of view is obscured by an obstacle, such as a street sign, a tree, or another vehicle, for example, such that an ability of the sensor to sense information is inhibited. Alternatively or additionally, the vehicle may detect that the vehicle is located near a predetermined location known to inhibit the ability of the sensor to sense information. The vehicle may determine that the ability of the sensor to sense information is inhibited in other manners and for other reasons as well.

When the ability of the sensor to sense information is inhibited, it may be desirable for the vehicle to modify the field of view of the sensor from the first field of view to a desired field of view that improves the ability of the sensor to sense information. To this end, the vehicle may, for example, modify a position of the vehicle (e.g., by modifying a speed of the vehicle), such that the field of view of the sensor is modified. In some cases, however, modifying a position of the vehicle may be contrary to one or more predetermined constraints including, for example, constraints based on traffic laws and/or constraints based on passenger comfort. In such cases, it may be dangerous or otherwise disadvantageous for the vehicle to modify the field of view of the sensor from the first field of view to the desired field of view.

Accordingly, the vehicle may determine a second field of view that that improves the ability of the sensor to sense information while still adhering to (or adhering to more of) the predetermined constraints. The vehicle may then modify the field of view of the sensor from the first field of view to the second field of view, thereby causing the sensor to sense information in the second field of view. The vehicle may modify the field of view by, for example, modifying a position of the vehicle, modifying a speed of the vehicle, modifying an acceleration of the vehicle, modifying a position of the sensor, and/or modifying an orientation of the sensor.

Figure 1:
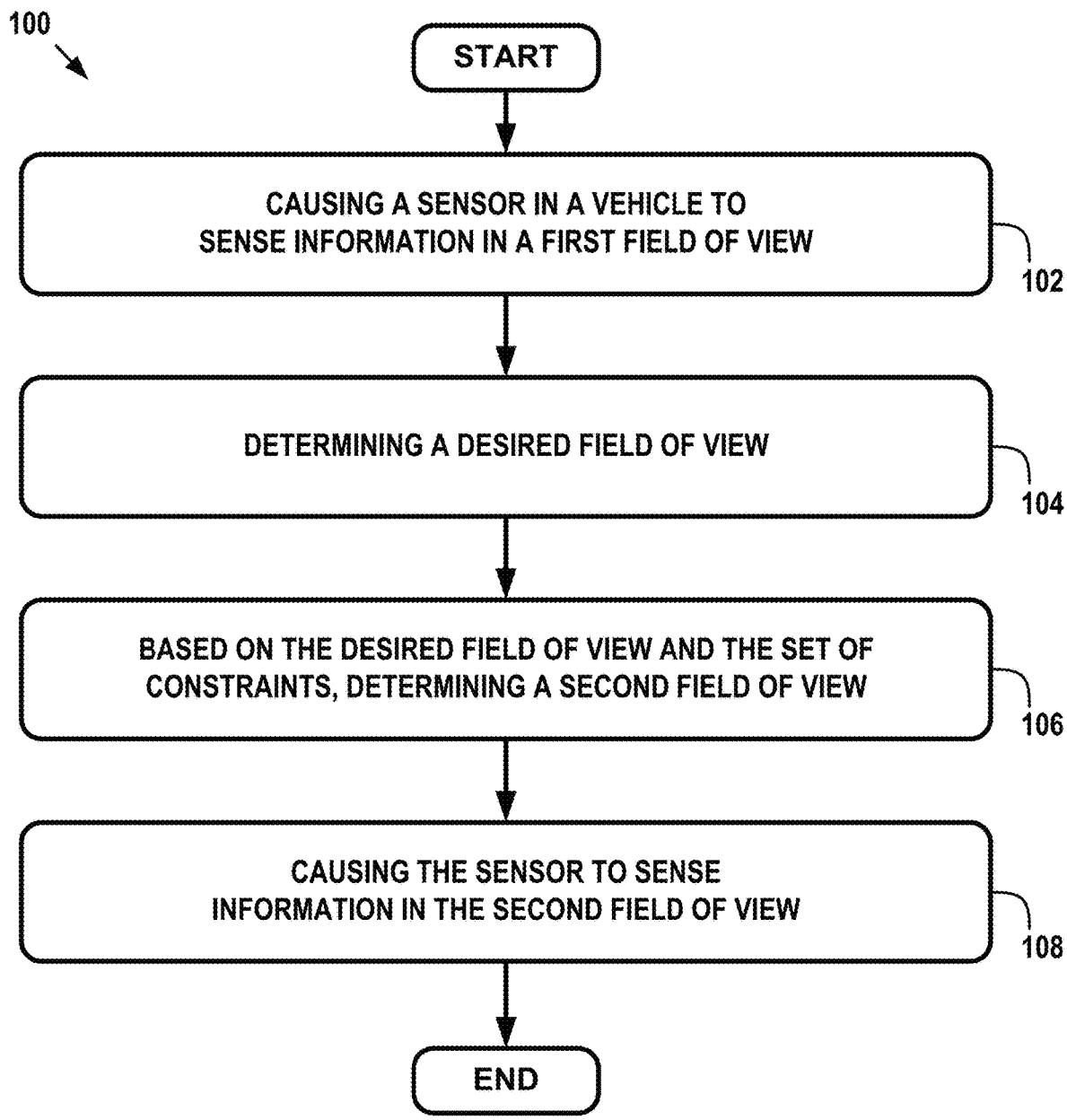
FIG. 1 is a flow chart illustrating an example method, in accordance with an embodiment.

FIG. 1 is a flow chart illustrating an example method 100, in accordance with an embodiment.

Method 100 shown in FIG. 1 presents an embodiment of a method that, for example, could be used with the vehicles described herein. Method 100 may include one or more operations, functions, or actions as illustrated by one or more of blocks 102-108. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 100 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer-readable medium, such as, for example, a storage device including a disk or hard drive. The computer-readable medium may include a non-transitory computer-readable medium, for example, such as computer-readable media that store data for short periods of time like register memory, processor cache, and Random Access Memory (RAM). The computer-readable medium may also include non-transitory media, such as secondary or persistent long term storage, like read only memory (ROM), optical or magnetic disks, and compact-disc read only memory (CD-ROM), for example. The computer-readable media may also be any other volatile or non-volatile storage systems. The computer-readable medium may be considered a computer-readable storage medium, a tangible storage device, or other article of manufacture, for example.

In addition, for the method 100 and other processes and methods disclosed herein, each block may represent circuitry that is configured to perform the specific logical functions in the process.

The method 100 begins at block 102 where a vehicle causes a sensor in the vehicle to sense information in a first field of view. The first field of view may include any portion of the environment surrounding the vehicle.

As noted above, in some cases the vehicle may detect that the first field of view is obscured by an obstacle, such as a street sign, a tree, or another vehicle, for example, such that an ability of the sensor to sense information is inhibited. Alternatively or additionally, the vehicle may detect that the vehicle is located near a predetermined location known to inhibit the ability of the sensor to sense information. The vehicle may determine that the ability of the sensor to sense information is inhibited in other manners and for other reasons as well.

Accordingly, at block 104, the vehicle determines a desired field of view. The desired field of view may be any field of view that improves the ability of the sensor to sense information. For example, if the first field of view includes an obstacle, as in the example above, the desired field of view may avoid the obstacle, may include less of the obstacle, and/or may enable the sensor to "see around" the obstacle. As another example, if the first field of view does not include a particular portion of the environment in which the vehicle would like to sense information, the desired field of view may include some or all of the particular portion of the environment. The desired field of view may take other forms as well.

In some embodiments, the vehicle may determine the desired field of view relative to the first field of view. For example, in embodiments where the first field of view includes an obstacle in a far right portion of the first field of view, the vehicle may determine the desired field of view to be forward of (e.g., by a particular number of feet) and/or rotated to the left from (e.g., by a particular angle) the first field of view, thereby including less of the obstacle.

In other embodiments, the vehicle may determine the desired field of view relative to the vehicle. For example, in embodiments where the first field of view does not include a particular portion of the environment in which the vehicle would like to sense information, the vehicle may determine a location of the particular portion of the environment relative to the vehicle (e.g., 6 feet away from the vehicle in a direction 50° to the right of a direction of travel of the vehicle) and may determine the desired field of view to include the particular portion of the environment (e.g., the desired field of view may span from 10° to 70° to the right of a direction of travel of the vehicle).

In still other embodiments, the vehicle may determine the desired field of view absolutely. For example, in embodiments where the first field of view does not include a particular portion of the environment in which the vehicle would like to sense information, the vehicle may determine an absolute location of the vehicle and an absolute location of the particular portion of the environment (e.g., a particular latitude and longitude), and may determine the desired field of view to include the particular portion of the environment (e.g., the desired field of view may include the particular latitude and longitude).

The vehicle may determine the desired field of view in other manners as well.

In some cases, however, modifying the field of view of the sensor from the first field of view to the desired field of view may be contrary to one or more constraints for the vehicle, such as constraints based on traffic laws, constraints based on passenger comfort, and constraints based on passenger safety. Other constraints are possible as well. The constraints may take a number of forms.

In some embodiments, the constraints may be predetermined and stored at the vehicle prior to operation of the vehicle. For example, a constraint on a speed of the vehicle may be predetermined and stored at the vehicle. Alternatively or additionally, the constraints may be determined and/or updated by the vehicle during operation. For example, the vehicle may determine a constraint on a speed of the vehicle by detecting a speed limit sign, detecting a speed of a neighboring vehicle, and/or by determining a location of the vehicle, querying a server with the location, and receiving the constraint on the speed of the vehicle from the server. Still alternatively or additionally, the constraints may be predetermined and stored at the vehicle prior to operation and may be updated each time the vehicle powers on. For example, upon powering on, the vehicle may query a server for any updates to the constraints. Still alternatively or additionally, the constraints may be predetermined and stored at the vehicle and may be updated by a user of the vehicle through, for example, a user-interface. The constraints may be maintained at the vehicle in other manners as well.

FIG. 2 illustrates example constraints 200 for a vehicle, in accordance with an embodiment. As shown, the example constraints 200 include a constraint 202 on a speed of the vehicle, a constraint on a crosswalk proximity (e.g., how close the vehicle can be to a crosswalk), a constraint on an other-vehicle proximity (e.g., how close the vehicle can be to another vehicle, and a constraint 204 on a deceleration of the vehicle.

Each constraint may be associated with a value or range of values. For example, as shown, the constraint 202 on the speed of the vehicle is shown to have a value of 35-45 miles per hour and the constraint 204 on the deceleration of the vehicle is shown to have a value of less than 4.8 feet per second squared. Other values and other units are possible as well.

In some embodiments, the value or range of values associated with a constraint may be constant. In other embodiments, however, the value or range of values associated with a constraint may vary. For example, the constraint 202 on the speed may vary depending on a location of the vehicle, as speed limits may vary for different roads. The vehicle may update the constraint 202 on the speed depending on the location of the vehicle (e.g., as determined by the vehicle). Alternatively or additionally, a number of different values or ranges of values may be associated with each constraint. For example, the constraint 204 on the deceleration may vary depending on a weather type in the environment where the vehicle is located, as it may be desirable to decelerate more slowly in some types of weather (e.g., rain or ice) to avoid sliding. Thus, the vehicle may maintain a number of constraints on the deceleration for a number of weather types and may select the constraint for the weather type most similar to the weather type in the environment where the vehicle is located. The constraints and values may take other forms as well.

In some embodiments, in addition to maintaining the constraints and the values, the vehicle may maintain a weighting for each of the constraints that indicates an importance of adhering to the constraint. For example, each constraint may be weighted out of 100, where a weighting of 100 indicates that the constraint must be adhered to and decreasing weightings indicate decreasing importance of adherence. As shown, the constraint 202 on the speed of the vehicle has a weighting of 100. This weighting may be chosen because failing to adhere to the constraint 202 (e.g., by speeding) could be illegal and/or dangerous. On the other hand, as shown, the constraint 204 on the deceleration of the vehicle has a weighting of only 20. This weighting may be chosen because failing to adhere to the constraint 204 (e.g., by slamming on the brakes) could cause passenger discomfort, without being illegal or dangerous.

It will be understood that the example constraints, values, and weightings shown are merely illustrative and are not meant to be limiting, and that other constraints, values, and weightings are possible as well.

In some embodiments, instead of maintaining a weighting for each constraint, the vehicle may maintain a range of values for each constraint and a score for each of the values. Each score may indicate how well the value adheres to the constraint. For example, the constraint 202 on the speed may have the range of values 35-45 miles per hour and different values in the range of values may have different scores. Some values in the range of values may have a higher score than others. For instance, values in the 40-45 miles per hour range may have a higher score than values in the 35-40 miles per hour range, indicating that the values in the 40-45 miles per hour range better adhere to the constraint than the values in the 35-40 miles per hour range. Other examples are possible as well.

It will be understood that the example constraints, values, and scores described above are merely illustrative and are not meant to be limiting, and that other constraints, values, and scores are possible as well.

Returning to FIG. 1, in some cases modifying the field of view of the sensor from the first field of view to the desired field of view may be contrary to one or more of constraints for the vehicle. For example, modifying the field of view of the sensor from the first field of view to the desired field of view may require that the vehicle move forward, but moving forward may cause the vehicle to break a constraint on crosswalk proximity (e.g., how close the vehicle can be to a crosswalk), as described above. Other examples are possible as well.

In such cases, it may be dangerous or otherwise disadvantageous for the vehicle to modify the field of view of the sensor from the first field of view to the desired field of view. Accordingly, at block 106, the vehicle determines a second field of view based on the desired field of view and the set of constraints. To this end, the vehicle may, for example, use an optimization algorithm to maximize the ability of the sensor to sense information and adherence to the constraints. The algorithm may take into account the weightings or scores associated with the constraints, as described above. It will be understood that the algorithm may take any number of forms. In general, the algorithm may be any function that determines the second field of view based on the desired field of view and the constraints.

At block 108, the vehicle causes the sensor to sense information in the second field of view. To this end, the vehicle may modify the field of view of the sensor from the first field of view to the second field of view. The vehicle may modify the field of view by, for example, modifying a position of the vehicle, modifying a speed of the vehicle, modifying an acceleration of the vehicle, modifying a position of the sensor, and/or modifying an orientation of the sensor. The vehicle may modify the field of view in other manners as well.

In some embodiments, in addition to modifying the field of view of the sensor, the vehicle may additionally request information in a requested field of view from one or more external sensors that are physically separate from the vehicle. The external sensors may include, for example, sensors on traffic signals, signs, or other vehicles. Other external sensors are possible as well.

Because the external sensor is physically separate from the vehicle, the external sensor may be able to sense information in a field of view that is inaccessible to the vehicle. For example, an external sensor on a traffic signal may be able to sense information that is further away, due to its comparatively higher position. As another example, an external sensor on another vehicle may be able to "see around" an obstacle that is in the field of view of the sensor on the vehicle. Other examples are possible as well.

In order to request information in a requested field of view from an external sensor, the vehicle may determine the requested field of view and may send to the external sensor a request for the requested field of view. The external sensor may then sense information in the requested field of view. Further, the external sensor may send to the vehicle at least some of the information sensed in the requested field of view.

In some embodiments, the vehicle may determine the second field of view based on the requested field of view in addition to the desired field of view and the constraints. For example, the vehicle may determine a second field of view that, when supplemented with the requested field of view, will improve the ability of the sensor to sense information about the environment. Other examples are possible as well.

A number of example implementations of the method 100 are described below in connection with FIGS. 3A-5B.

For purposes of illustration, a number of example implementations are described. It is to be understood, however, that the example implementations are illustrative only and are not meant to be limiting. Other example implementations are possible as well.

Figure 3A:
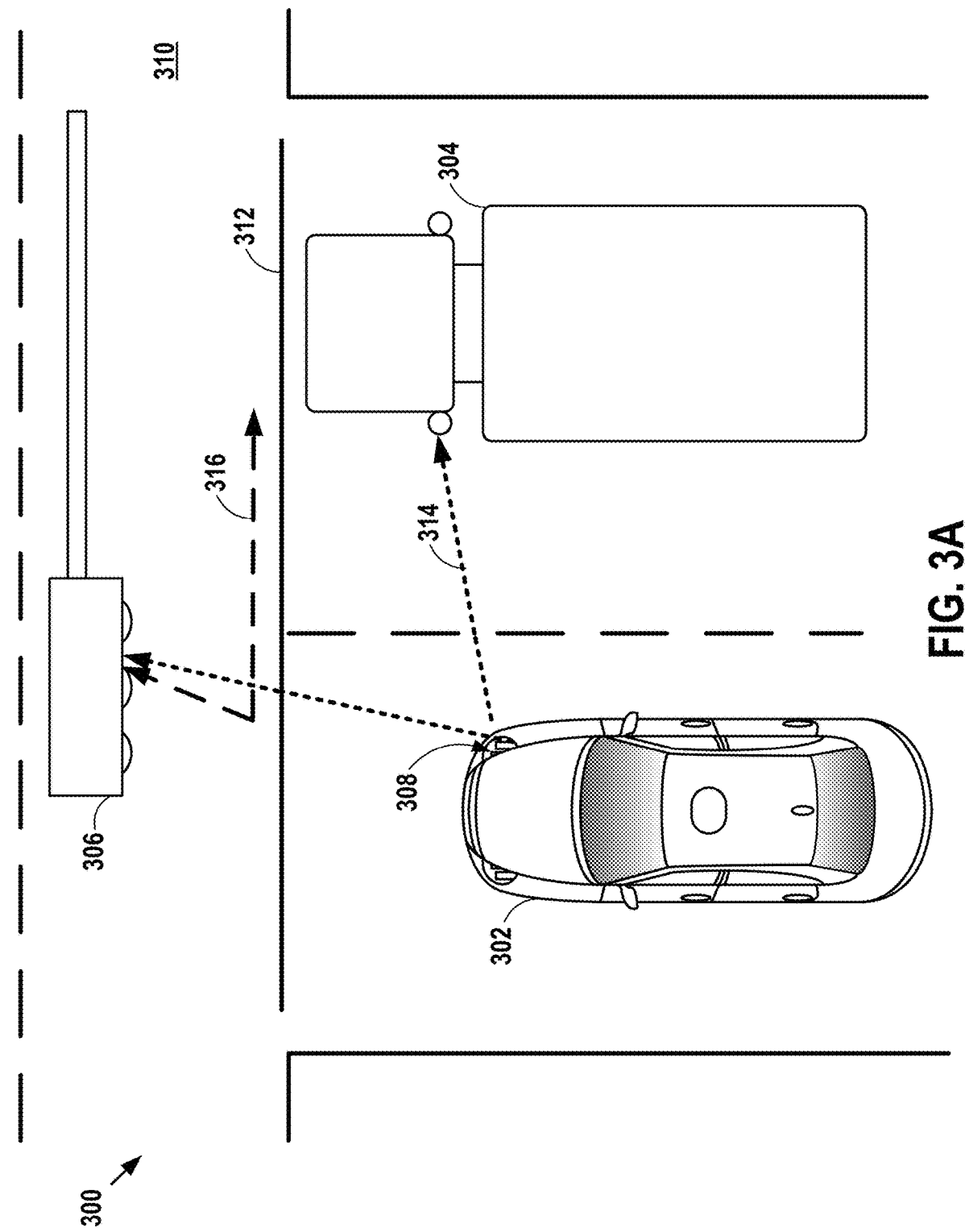
FIGS. 3M-B illustrate an example implementation of the example method, in accordance with an embodiment.
Figure 3B:
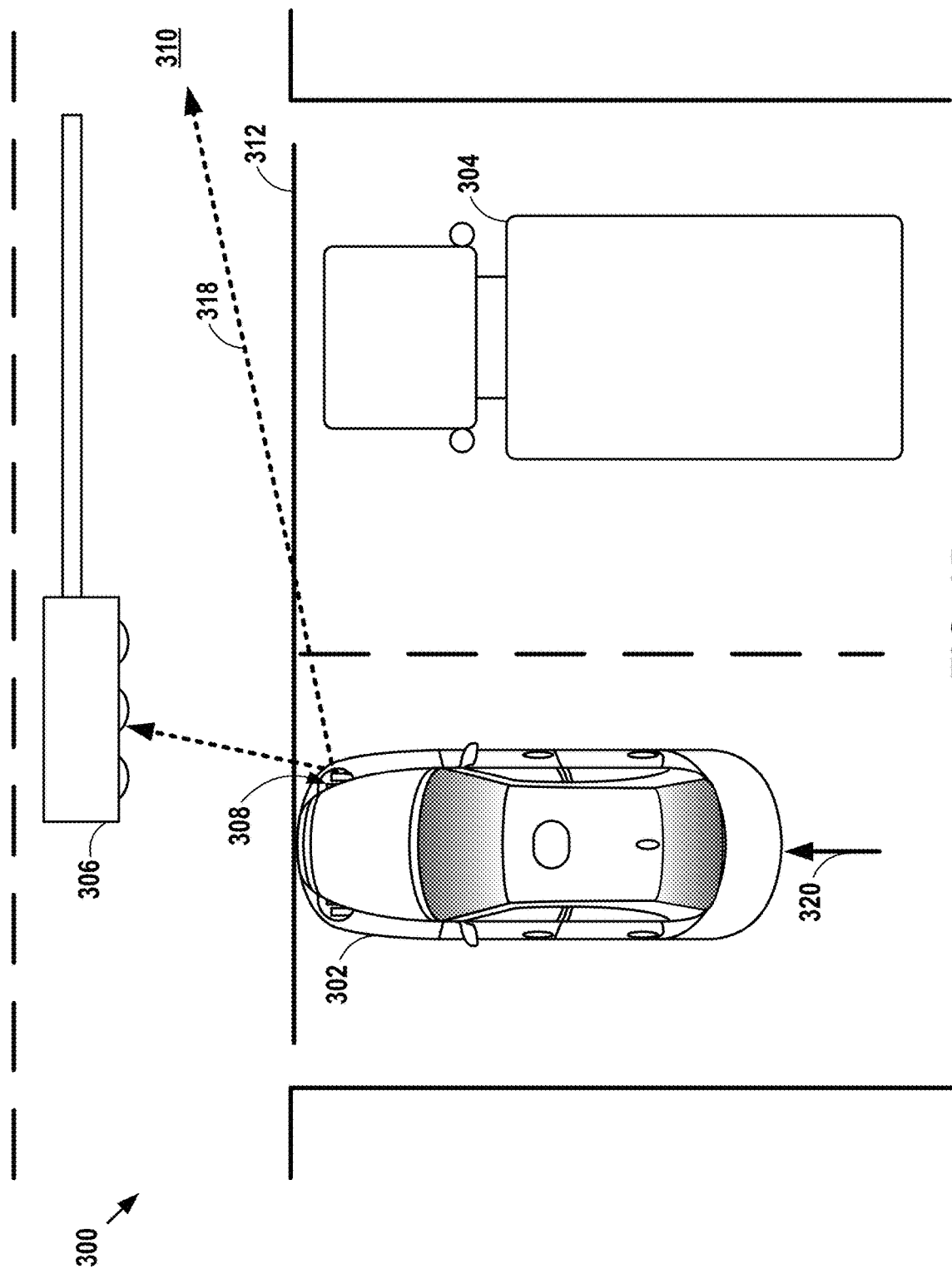

FIGS. 3A-B illustrate an example implementation of the example method, in accordance with an embodiment. As shown in FIG. 3A, a vehicle 302 is located at an intersection 300. The vehicle 302 may have a set of constraints, as described above. For example, the vehicle 302 may have a constraint on a crosswalk proximity (e.g., how close the vehicle 302 can be to a crosswalk 312) that requires a front of the vehicle 302 to remain behind or adjacent to the crosswalk 312. The vehicle 302 may have other constraints as well.

As shown, the vehicle 302 includes a sensor 308 that is configured to sense information about the intersection 300 in a first field of view 314, as indicated by the dotted arrows. The first field of view 314 is shown to include a traffic signal 306 in the intersection 300, such that the sensor 308 is able to sense information about the traffic signal 306. However, as shown, the first field of view 314 does not include a portion 310 of the intersection 300 because of the presence of a truck 304 adjacent to the vehicle 302. Accordingly, the sensor 308 is not able to sense information about the portion 310 of the intersection 300 from which oncoming traffic may be entering the intersection 300.

In the example implementation, the vehicle 302 may wish to make a left turn on a red light (assuming such a maneuver is legal at the intersection 300). In order to safely make the left turn, the vehicle 302 must determine whether any oncoming traffic is entering the intersection 300 from the portion 310 of the intersection 300. However, as noted above, the first field of view 314 does not include the portion 310 of the intersection 300, such that the sensor 308 is not able to sense information about the portion 310 of the intersection 300. Thus, the vehicle 302 is not able to determine whether it is safe to make a left turn at the intersection 300.

Accordingly, the vehicle 302 may determine a desired field of view 316. The desired field of view 316 may be any field of view that improves the ability of the sensor 308 to sense information. In the example implementation, the desired field of view 316 may be a field of view that includes the portion 310 of the intersection 300, as indicated by the dotted arrows.

However, in order to modify the field of view of the sensor 308 from the first field of view 314 to the desired field of view 316, the vehicle 302 would have to move forward beyond the crosswalk 312, thereby breaking the crosswalk proximity constraint mentioned above. Accordingly, rather than modifying the field of view of the sensor 308 from the first field of view 314 to the desired field of view 316, the vehicle 302 may determine a second field of view 318, as shown in FIG. 3B. In particular, the vehicle 302 may determine the second field of view 318 based on the desired field of view 316 and the constraints for the vehicle 302. To this end, the vehicle 302 may, for example, use an optimization algorithm to maximize both the ability of the sensor 308 to sense information and adherence to the constraints, as described above.

Once the vehicle 302 has determined the second field of view 318, the vehicle 302 may cause the sensor 308 to sense information in the second field of view 318. To this end, the vehicle 302 may modify a position of the vehicle 302, as shown by the arrow 320.

Like the desired field of view 316, the second field of view 318 may improve the ability of the sensor 308 to sense information and, further, may include (or mostly include) the portion 310 of the intersection 300, as indicated by the dotted arrows. Additionally, however, the vehicle 302 may sense information in the second field of view 318 without moving beyond the crosswalk 312. As shown, the vehicle 302 is adjacent to, but not beyond, the crosswalk 312, thereby adhering to the crosswalk proximity constraint mentioned above.

In this manner, the vehicle 302 may improve an ability of the sensor 308 to sense information about the intersection 300 while still adhering to one or more constraints for the vehicle 302.

In some embodiments, the traffic signal 306 may include an external sensor (not shown). In these embodiments, the vehicle 302 may additionally determine a requested field of view, such as a field of view that includes the portion 310 of the intersection 300, and may send to the external sensor a request for the requested field of view. The external sensor may sense information in the requested field of view and may send at least some of the information in the requested field of view to the vehicle 302.

The information in the requested field of view may allow the vehicle 302 to make a more informed decision about whether it is safe to make a left turn. In particular, because the external sensor is positioned on the traffic signal 306 (and thus higher than the sensor 308 on the vehicle 302), the requested field of view may include portions of the road that are further away from the intersection 300. Thus, the requested field of view may include additional oncoming traffic that is not included in the second field of view 318.

Figure 4A:
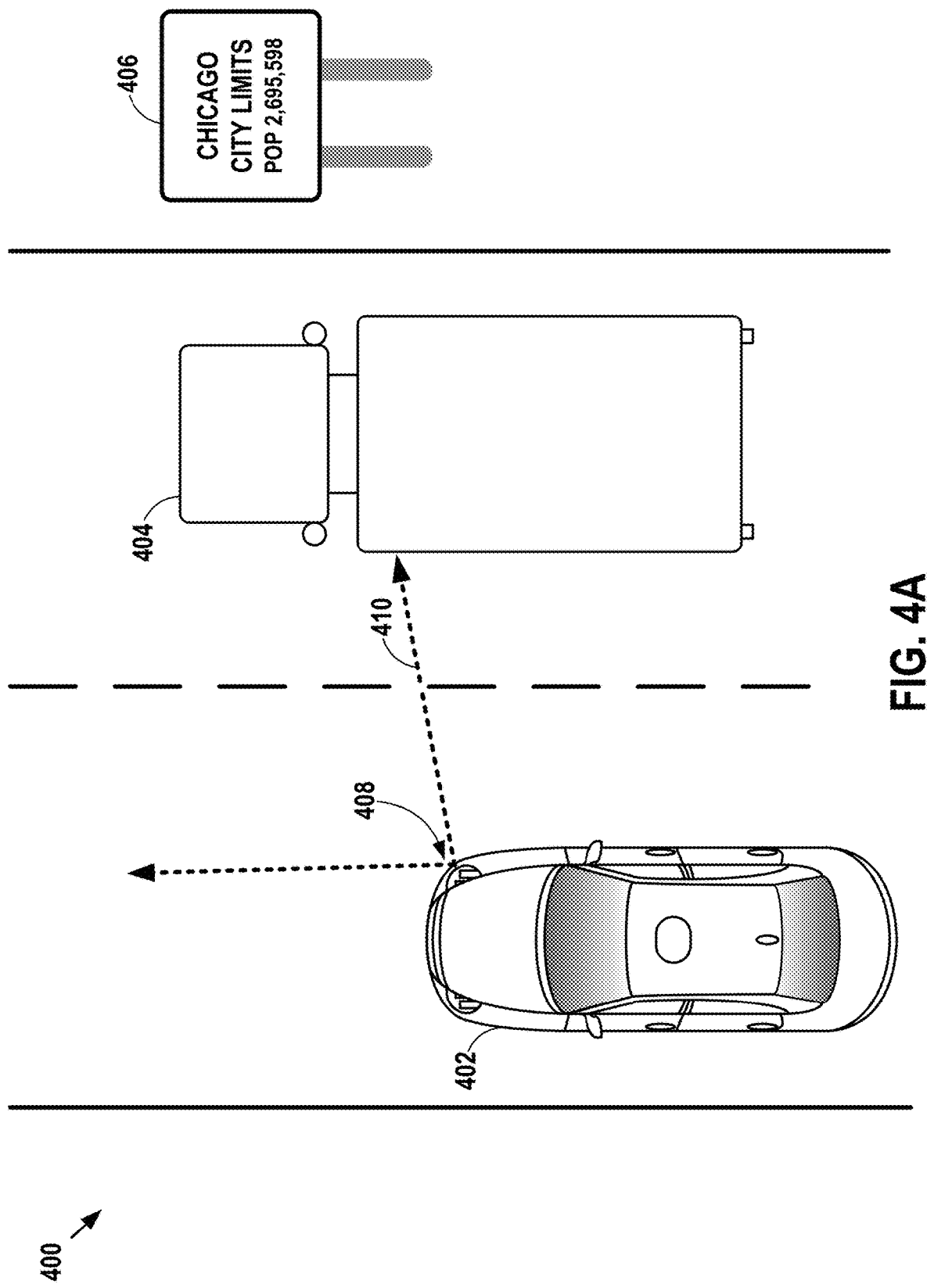
FIGS. 4A-B illustrate an example implementation of the example method, in accordance with an embodiment.
Figure 4B:
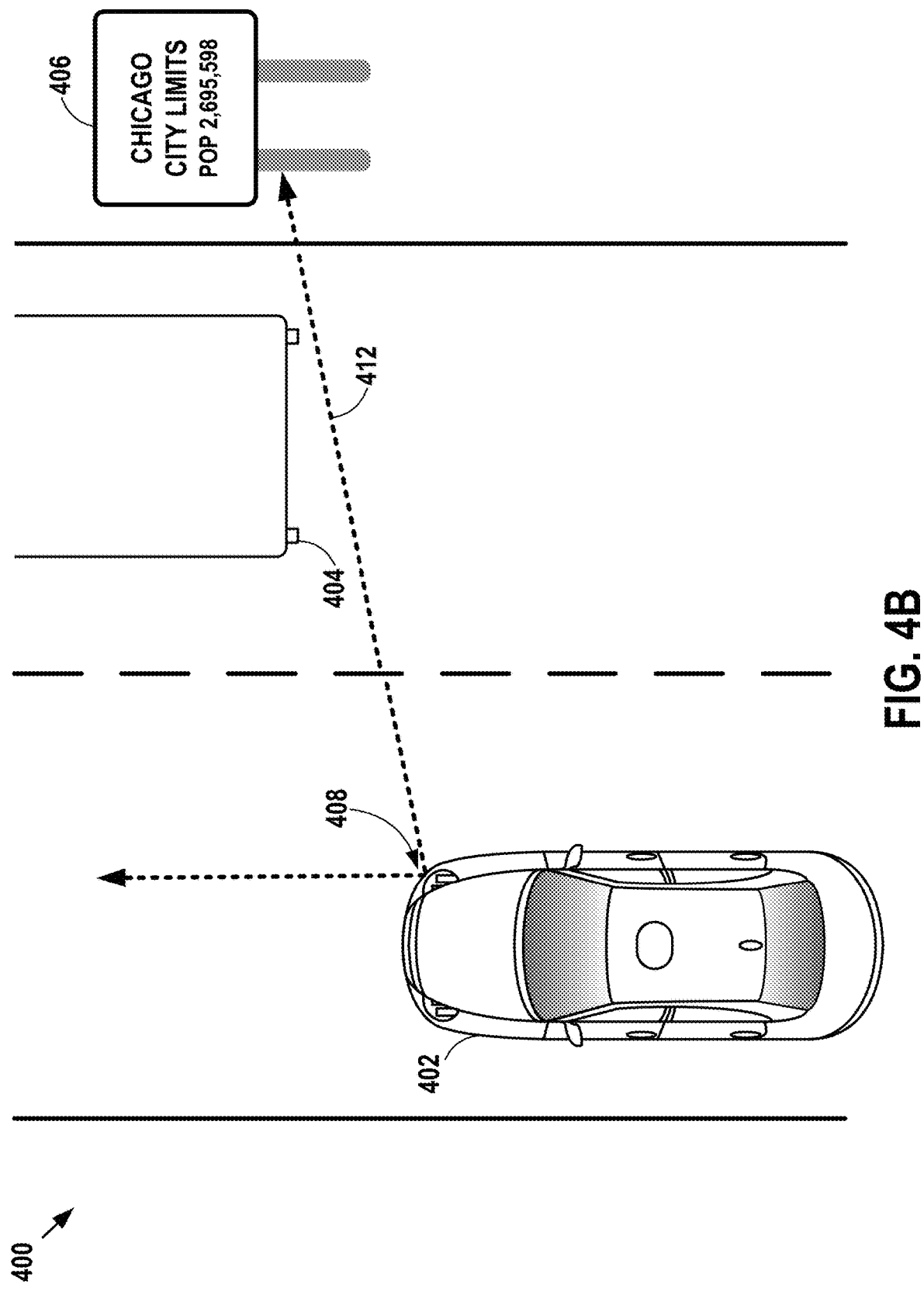

FIGS. 4A-B illustrate an example implementation of the example method, in accordance with an embodiment. As shown in FIG. 4A, a vehicle 402 is located on a road 400. The vehicle 402 may have a set of constraints, as described above. For example, the vehicle 402 may have a constraint to maintain a speed between 25 and 35 miles per hour. Additionally, the vehicle 402 may have a constraint to not exceed (e.g., in magnitude) a deceleration of feet per second squared. The vehicle 402 may have other constraints as well. Additionally, the vehicle 402 may maintain weightings for each of the constraints. For instance, the constraint on the speed of the vehicle 402 may be weighted more heavily than the constraint on the deceleration of the vehicle 402, as the constraint on the speed may be based on a traffic law (e.g., a speed limit) while the constraint on the deceleration may be based on passenger comfort. Other weightings are possible as well.

As shown, the vehicle 402 includes a sensor 408 that is configured to sense information in a first field of view 410, as indicated by the dotted arrows. As shown, the first field of view 410 includes an obstacle, namely a truck 404. As a result, the sensor 408 is not able to sense information about a sign 406.

In the example implementation, the vehicle 402 may wish to detect the sign 406. However, as shown, the sign 406 is blocked in first field of view 410 by the truck 404. Thus, the vehicle 402 is not able to detect the sign 406.

Accordingly, the vehicle 402 may determine a desired field of view (not shown). The desired field of view may be any field of view that improves the ability of the sensor 408 to sense information. In the example implementation, the desired field of view may be a field of view that does not include (or includes less of) the truck 404, or at least that allows the vehicle 402 to detect the sign 406.

In order to achieve the desired field of view, the vehicle 402 may, for example, decelerate very quickly and/or stop, allowing the truck 404 to move away from the vehicle 402, thereby leaving the field of view of the sensor 408. However, such quick deceleration and/or stopping may break one or both of the constraints on the speed and deceleration of the vehicle 402, as mentioned above.

Accordingly, rather than modifying the field of view of the sensor 408 from the first field of view 410 to the desired field of view, the vehicle 402 may determine a second field of view 412, as shown in FIG. 4B. In particular, the vehicle 402 may determine the second field of view 412 based on the desired field of view and the constraints for the vehicle 402. To this end, the vehicle 402 may, for example, use an optimization algorithm to maximize both the ability of the sensor 408 to sense information and adherence to the constraints, as described above. As the constraint on the speed of the vehicle 402 is weighted more heavily than the constraint on the deceleration of the vehicle 402, the optimization algorithm may place more importance on adhering to the constraint on the speed than on the constraint on the deceleration.

Once the vehicle 402 has determined the second field of view 412, the vehicle 402 may cause the sensor 408 to sense information in the second field of view 412. To this end, the vehicle 402 may decelerate, thereby modifying a speed of the vehicle 402.

Like the desired field of view, the second field of view 412 may improve the ability of the sensor 408 to sense information and, further, may include (or mostly include) the sign 406, as indicated by the dotted arrows. Additionally, however, the vehicle 402 may modify the field of view of the sensor 408 from the first field of view 410 to the second field of view 412 by slowing its speed, and not stopping as for the desired field of view, thereby adhering to the speed constraint for the vehicle 402. Further, in some cases, the vehicle 402 may modify the field of view of the sensor 408 from the first field of view 410 to the second field of view 412 by braking at least somewhat slowly, and not quickly as for the desired field of view, thereby adhering (or coming close to adhering) to the deceleration constraint for the vehicle 402.

In this manner, the vehicle 402 may improve an ability of the sensor 408 to sense information about the road 400 while still adhering to one or more constraints for the vehicle 402.

Figure 5A:
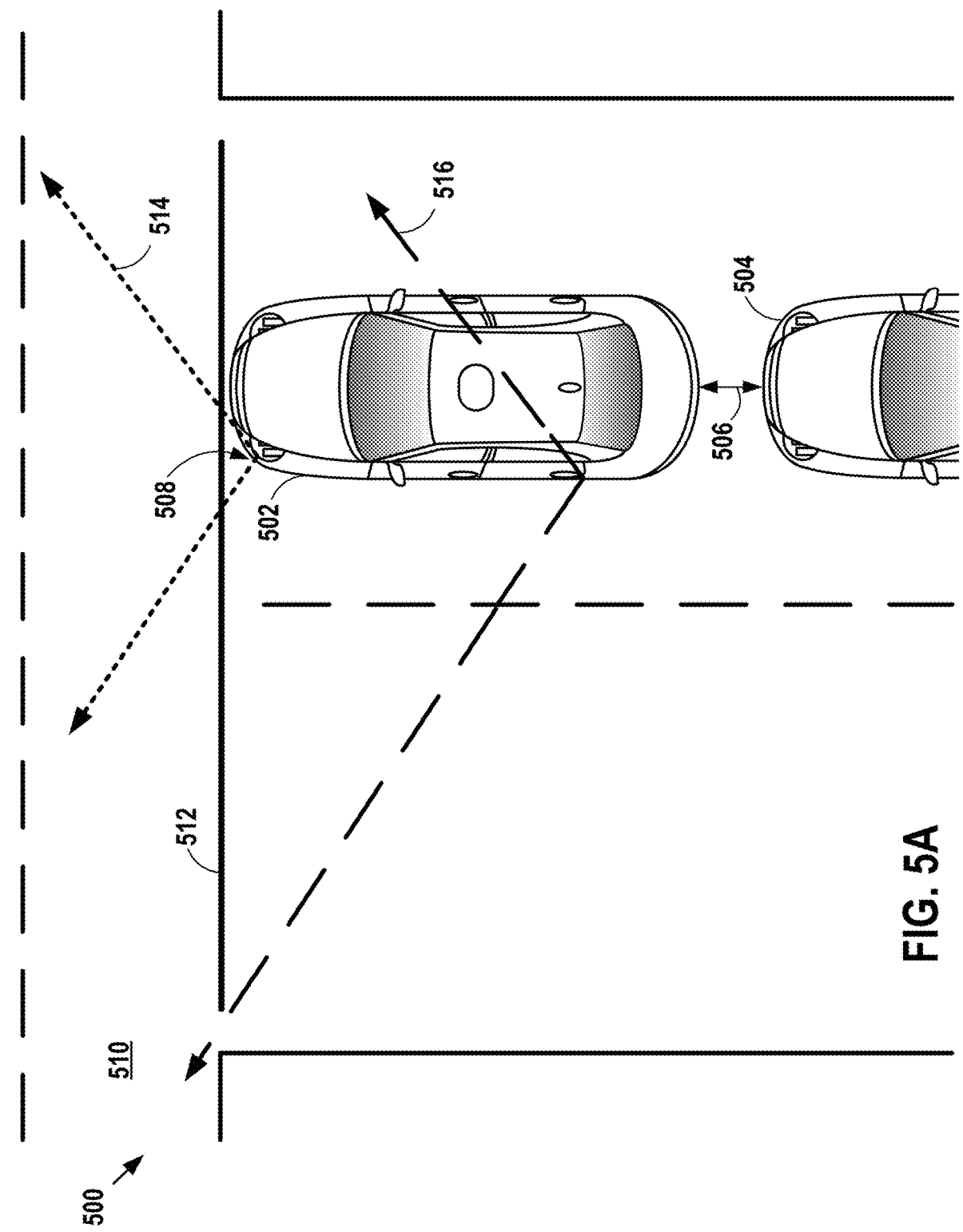
FIGS. 5A-B illustrate an example implementation of the example method, in accordance with an embodiment.
Figure 5B:
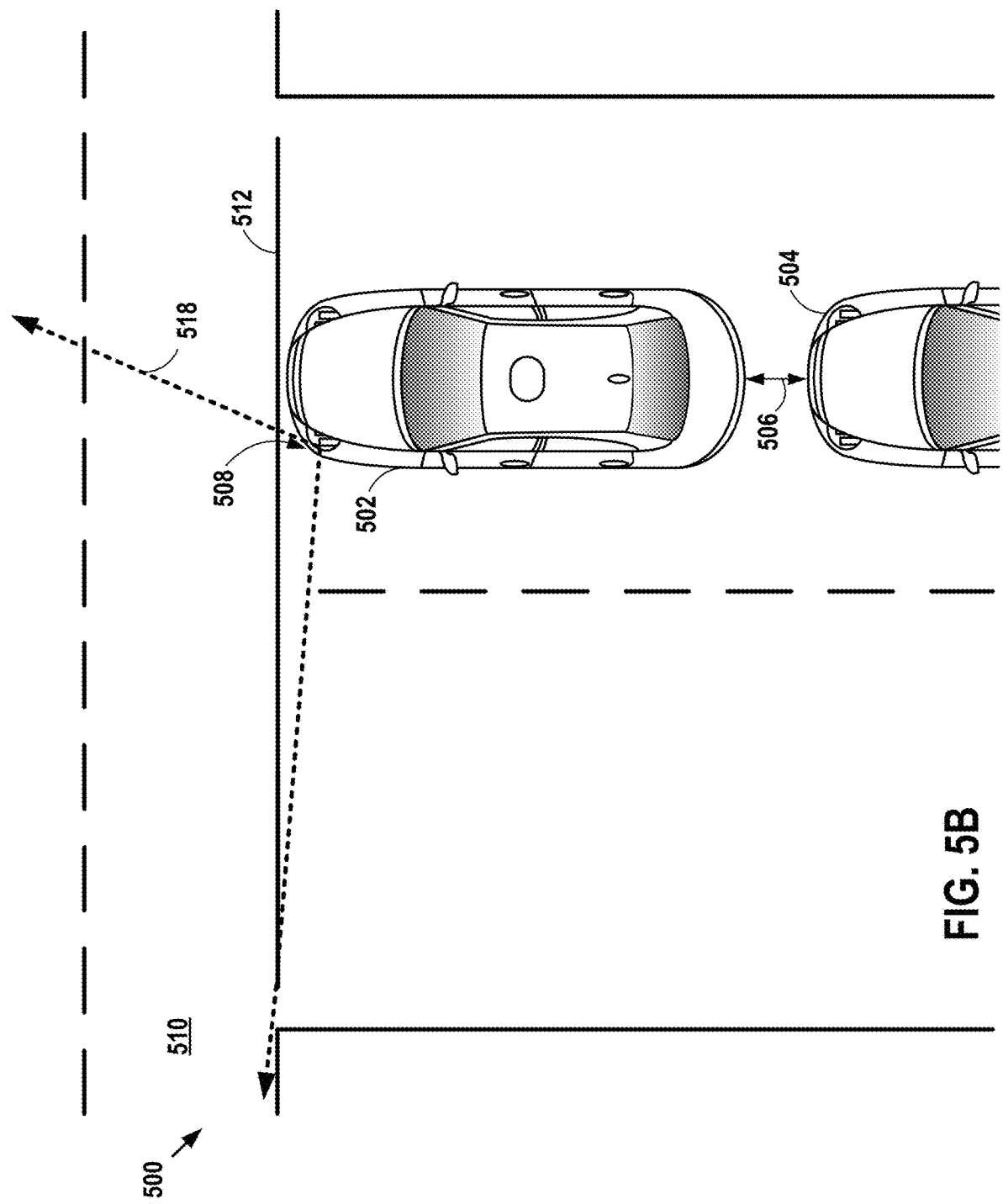

FIGS. 5A-B illustrate an example implementation of the example method, in accordance with an embodiment. As shown in FIG. 5A, a vehicle 502 is located at an intersection 500. The vehicle 502 may have a set of constraints, as described above. For example, the vehicle 502 may have a constraint on an other-vehicle proximity (e.g., how close the vehicle 502 can be to another vehicle 504) that relates to the vehicle 502 staying at least a minimum distance 506 from the other vehicle 504. The vehicle 502 may have other constraints as well.

As shown, the vehicle 502 includes a sensor 508 that is configured to sense information about the intersection 500 in a first field of view 514, as indicated by the dotted arrows. As shown, a portion 510 of the intersection 500 is outside the first field of view 514. Accordingly, the sensor 508 is not able to sense information about the portion 510 of the intersection 500 from which oncoming traffic may be entering the intersection 500.

In the example implementation, the vehicle 502 may wish to make a right turn into the intersection 500. In order to safely make the right turn, the vehicle 502 must determine whether any oncoming traffic is entering the intersection 500 from the portion 510 of the intersection 500. However, as noted above, the first field of view 514 does not include the portion 510 of the intersection 500, such that the sensor 508 is not able to sense information about the portion 510 of the intersection 500. Thus, the vehicle 502 is not able to determine whether it is safe to make a right turn at the intersection 500.

Accordingly, the vehicle 502 may determine a desired field of view 516. The desired field of view 516 may be any field of view that improves the ability of the sensor 508 to sense information. In the example implementation, the desired field of view 516 may be a field of view that includes the portion 510 of the intersection 500, as indicated by the dotted arrows.

However, in order to modify the field of view of the sensor 508 from the first field of view 514 to the desired field of view 516, the vehicle 502 would have to move closer to the other vehicle 504, such that the vehicle 502 is less than the minimum distance 506 from the other vehicle 504, contrary to the other-vehicle proximity constraint mentioned above.

Accordingly, rather than modifying the field of view of the sensor 508 from the first field of view 514 to the desired field of view 516, the vehicle 502 may determine a second field of view 518, as shown in FIG. 5B. In particular, the vehicle 502 may determine the second field of view 518 based on the desired field of view 516 and the constraints for the vehicle 502. To this end, the vehicle 502 may, for example, use an optimization algorithm to maximize both the ability of the sensor 508 to sense information and adherence to the constraints, as described above.

Once the vehicle 502 has determined the second field of view 518, the vehicle 502 may cause the sensor 508 to sense information in the second field of view 518. To this end, the vehicle 502 may modify an orientation of the sensor 508 (e.g., by rotating the sensor 508).

Like the desired field of view 516, the second field of view 518 may improve the ability of the sensor 508 to sense information and, further, may include (or mostly include) the portion 510 of the intersection 500, as indicated by the dotted arrows. Additionally, however, the vehicle 502 may sense information in the second field of view 518 without moving too close to the other vehicle 504, as required for the desired field of view 516. As shown, the vehicle 502 remains at least the minimum distance 506 from the other vehicle 504, thereby adhering to the other-vehicle proximity constraint mentioned above.

In this manner, the vehicle 502 may improve an ability of the sensor 508 to sense information about the intersection 500 while still adhering to one or more constraints for the vehicle 502.

Systems in which example embodiments of the above example methods may be implemented will now be described in greater detail. In general, an example system may be implemented in or may take the form of a vehicle. The vehicle may take a number of forms, including, for example, automobiles, cars, trucks, motorcycles, buses, boats, airplanes, helicopters, lawn mowers, earth movers, snowmobiles, recreational vehicles, amusement park vehicles, farm equipment, construction equipment, trams, golf carts, trains, and trolleys. Other vehicles are possible as well.

Further, another example system may take the form of non-transitory computer-readable medium, which has program instructions stored thereon that are executable by at least one processor to provide the functionality described herein. An example system may also take the form of a vehicle or a subsystem of a vehicle that includes such a non-transitory computer-readable medium having such program instructions stored thereon.

Figure 6:
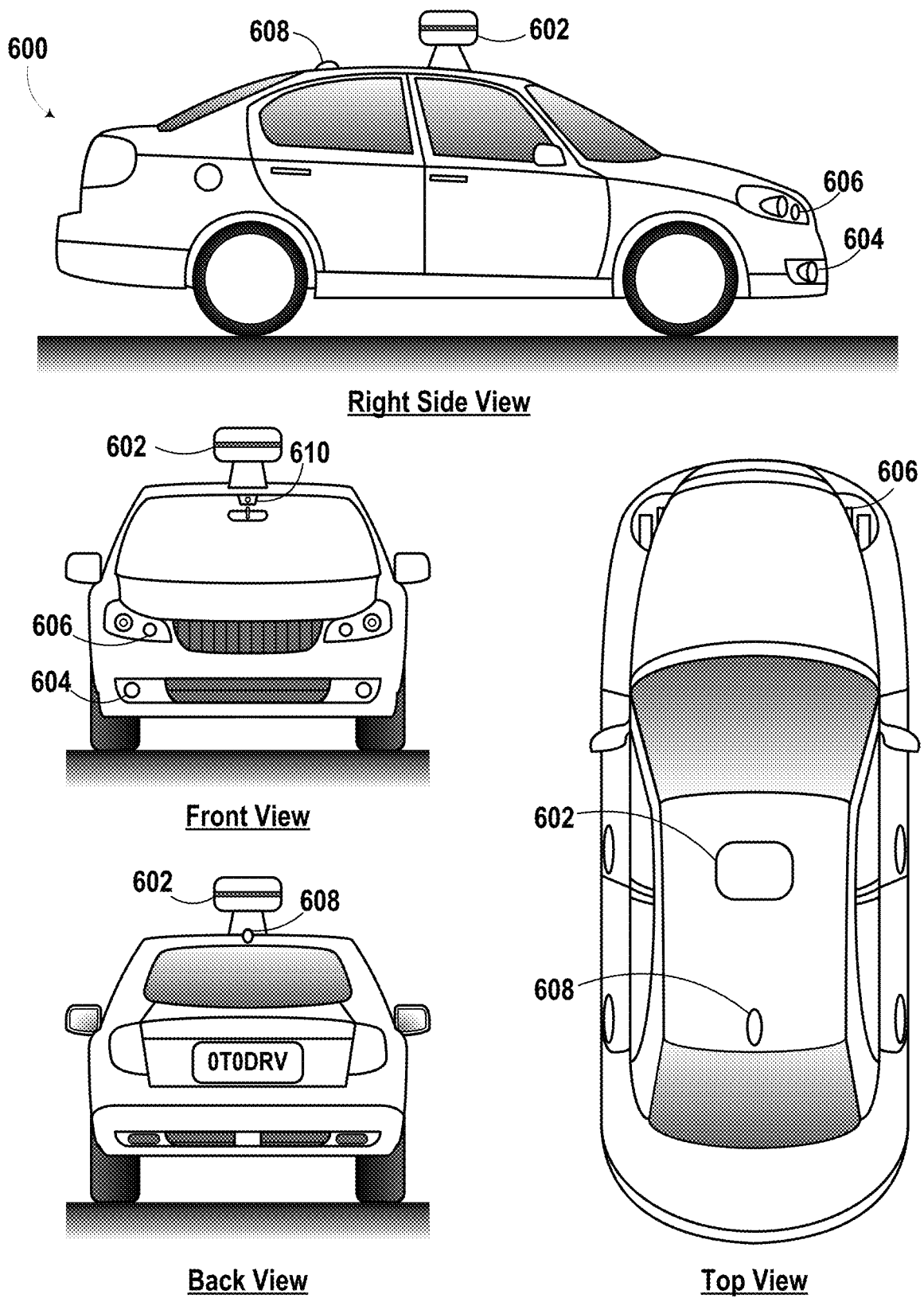
FIG. 6 illustrates an example vehicle, in accordance with an embodiment.

FIG. 6 illustrates an example vehicle 600, in accordance with an embodiment. In particular, FIG. 6 shows a Right Side View, Front View, Back View, and Top View of the vehicle 600. Although vehicle 600 is illustrated in FIG. 6 as a car, other embodiments are possible. For instance, the vehicle 600 could represent a truck, a van, a semi-trailer truck, a motorcycle, a golf cart, an off-road vehicle, or a farm vehicle, among other examples. As shown, the vehicle 600 includes a first sensor unit 602, a second sensor unit 604, a third sensor unit 606, a wireless communication system 608, and a camera 610.

Each of the first, second, and third sensor units 602-606 may include any combination of global positioning system sensors, inertial measurement units, radio detection and ranging (RADAR) units, laser rangefinders, light detection and ranging (LIDAR) units, cameras, and acoustic sensors. Other types of sensors are possible as well.

While the first, second, and third sensor units 602-606 are shown to be mounted in particular locations on the vehicle 600, in some embodiments the sensor unit 602 may be mounted elsewhere on the vehicle 600, either inside or outside the vehicle 600. Further, while only three sensor units are shown, in some embodiments more or fewer sensor units may be included in the vehicle 600.

In some embodiments, one or more of the first, second, and third sensor units 602-606 may include one or more movable mounts on which the sensors may be movably mounted. The movable mount may include, for example, a rotating platform. Sensors mounted on the rotating platform could be rotated so that the sensors may obtain information from each direction around the vehicle 600. Alternatively or additionally, the movable mount may include a tilting platform. Sensors mounted on the tilting platform could be tilted within a particular range of angles and/or azimuths so that the sensors may obtain information from a variety of angles. The movable mount may take other forms as well.

Further, in some embodiments, one or more of the first, second, and third sensor units 602-606 may include one or more actuators configured to adjust the position and/or orientation of sensors in the sensor unit by moving the sensors and/or movable mounts. Example actuators include motors, pneumatic actuators, hydraulic pistons, relays, solenoids, and piezoelectric actuators. Other actuators are possible as well.

The wireless communication system 608 may be any system configured to wirelessly couple to one or more other vehicles, sensors, or other entities, either directly or via a communication network. To this end, the wireless communication system 608 may include an antenna and a chipset for communicating with the other vehicles, sensors, or other entities either directly or over an air interface. The chipset or wireless communication system 608 in general may be arranged to communicate according to one or more other types of wireless communication (e.g., protocols) such as BLUETOOTH, communication protocols described in IEEE 802.11 (including any IEEE 802.11 revisions), cellular technology (such as GSM, CDMA, UMTS, EV-DO, WiMAX, or LTE), ZIGBEE, dedicated short range communications (DSRC), and radio frequency identification (RFID) communications, among other possibilities. The wireless communication system 608 may take other forms as well.

While the wireless communication system 608 is shown to be positioned on a roof of the vehicle 600, in other embodiments the wireless communication system 608 could be located, fully or in part, elsewhere.

The camera 610 may be any camera (e.g., a still camera, a video camera, etc.) configured to capture images of the environment in which the vehicle 600 is located. To this end, the camera 610 may be configured to detect visible light, or may be configured to detect light from other portions of the spectrum, such as infrared or ultraviolet light, or x-rays. Other types of cameras are possible as well. The camera 610 may be a two-dimensional detector, or may have a three-dimensional spatial range. In some embodiments, the camera 610 may be, for example, a range detector configured to generate a two-dimensional image indicating a distance from the camera 610 to a number of points in the environment. To this end, the camera 610 may use one or more range detecting techniques. For example, the camera 610 may use a structured light technique in which the vehicle 600 illuminates an object in the environment with a predetermined light pattern, such as a grid or checkerboard pattern and uses the camera 610 to detect a reflection of the predetermined light pattern off the object. Based on distortions in the reflected light pattern, the vehicle 600 may determine the distance to the points on the object. The predetermined light pattern may comprise infrared light, or light of another wavelength. As another example, the camera 610 may use a laser scanning technique in which the vehicle 600 emits a laser and scans across a number of points on an object in the environment. While scanning the object, the vehicle 600 uses the camera 610 to detect a reflection of the laser off the object for each point. Based on a length of time it takes the laser to reflect off the object at each point, the vehicle 600 may determine the distance to the points on the object. As yet another example, the camera 610 may use a time-of-flight technique in which the vehicle 600 emits a light pulse and uses the camera 610 to detect a reflection of the light pulse off an object at a number of points on the object. In particular, the camera 610 may include a number of pixels, and each pixel may detect the reflection of the light pulse from a point on the object. Based on a length of time it takes the light pulse to reflect off the object at each point, the vehicle 600 may determine the distance to the points on the object. The light pulse may be a laser pulse. Other range detecting techniques are possible as well, including stereo triangulation, sheet-of-light triangulation, interferometry, and coded aperture techniques, among others. The camera 610 may take other forms as well.

In some embodiments, the camera 610 may include a movable mount and/or an actuator, as described above, that are configured to adjust the position and/or orientation of the camera 610 by moving the camera 610 and/or the movable mount.

While the camera 610 is shown to be mounted inside a front windshield of the vehicle 600, in other embodiments the camera 610 may be mounted elsewhere on the vehicle 600, either inside or outside the vehicle 600.

The vehicle 600 may include one or more other components in addition to or instead of those shown.

Figure 7:
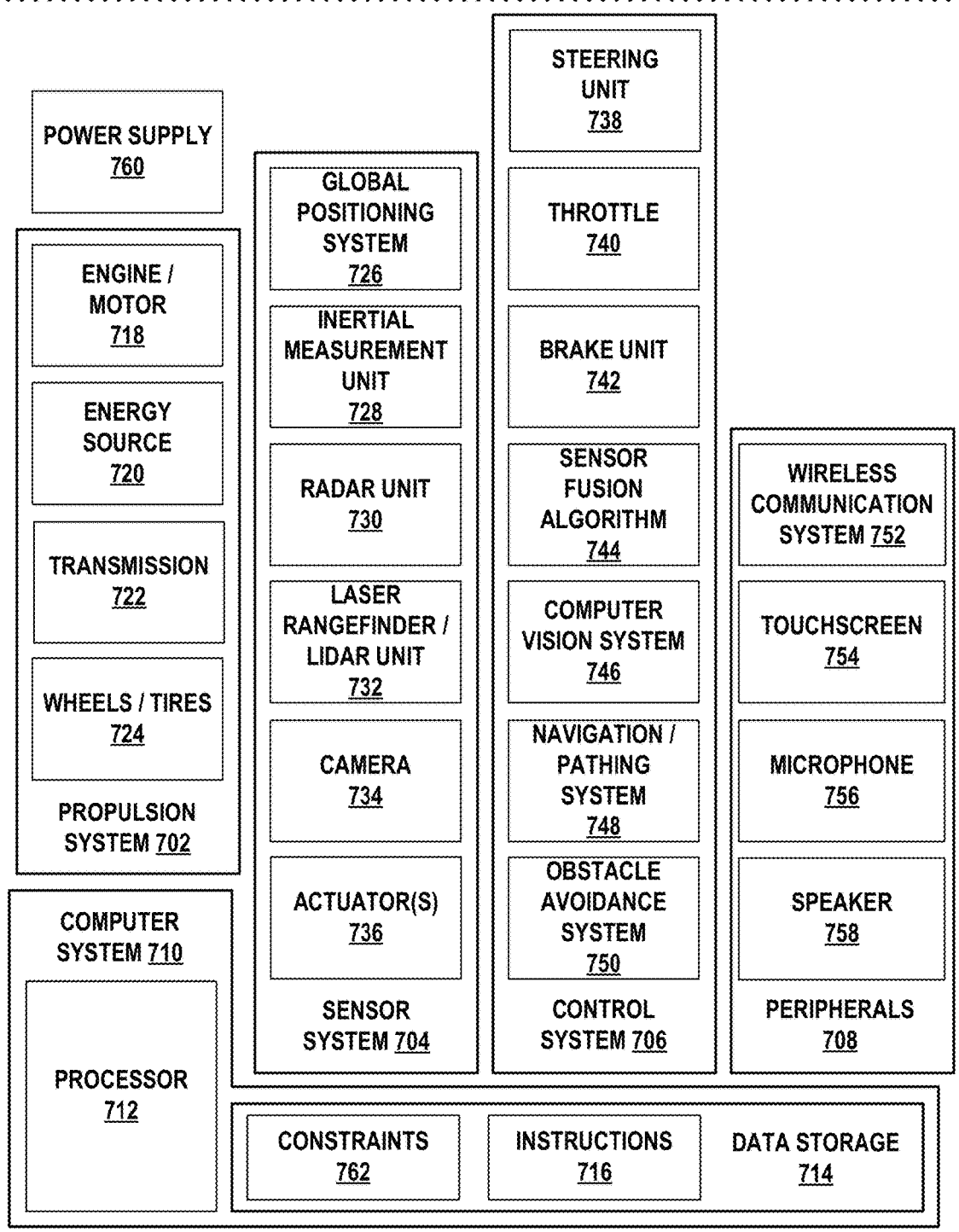
FIG. 7 is a simplified block diagram of an example vehicle, in accordance with an embodiment.

FIG. 7 is a simplified block diagram of an example vehicle 700, in accordance with an embodiment. The vehicle 700 may, for example, be similar to the vehicle 600 described above in connection with FIG. 6. The vehicle 700 may take other forms as well.

As shown, the vehicle 700 includes a propulsion system 702, a sensor system 704, a control system 706, peripherals 708, and a computer system 710 including a processor 712, data storage 714, and instructions 716. In other embodiments, the vehicle 700 may include more, fewer, or different systems, and each system may include more, fewer, or different components. Additionally, the systems and components shown may be combined or divided in any number of ways.

The propulsion system 702 may be configured to provide powered motion for the vehicle 700. As shown, the propulsion system 702 includes an engine/motor 718, an energy source 720, a transmission 722, and wheels/tires 724.

The engine/motor 718 may be or include any combination of an internal combustion engine, an electric motor, a steam engine, and a Stirling engine. Other motors and engines are possible as well. In some embodiments, the propulsion system 702 could include multiple types of engines and/or motors. For instance, a gas-electric hybrid car could include a gasoline engine and an electric motor. Other examples are possible.

The energy source 720 may be a source of energy that powers the engine/motor 718 in full or in part. That is, the engine/motor 718 may be configured to convert the energy source 720 into mechanical energy. Examples of energy sources 720 include gasoline, diesel, propane, other compressed gas-based fuels, ethanol, solar panels, batteries, and other sources of electrical power. The energy source(s) 720 could additionally or alternatively include any combination of fuel tanks, batteries, capacitors, and/or flywheels. In some embodiments, the energy source 720 may provide energy for other systems of the vehicle 700 as well.

The transmission 722 may be configured to transmit mechanical power from the engine/motor 718 to the wheels/tires 724. To this end, the transmission 722 may include a gearbox, clutch, differential, drive shafts, and/or other elements. In embodiments where the transmission 722 includes drive shafts, the drive shafts could include one or more axles that are configured to be coupled to the wheels/tires 724.

The wheels/tires 724 of vehicle 700 could be configured in various formats, including a unicycle, bicycle/motorcycle, tricycle, or car/truck four-wheel format. Other wheel/tire formats are possible as well, such as those including six or more wheels. In any case, the wheels/tires 724 of vehicle 700 may be configured to rotate differentially with respect to other wheels/tires 724. In some embodiments, the wheels/tires 724 may include at least one wheel that is fixedly attached to the transmission 722 and at least one tire coupled to a rim of the wheel that could make contact with the driving surface. The wheels/tires 724 may include any combination of metal and rubber, or combination of other materials.

The propulsion system 702 may additionally or alternatively include components other than those shown.

The sensor system 704 may include a number of sensors configured to sense information about an environment in which the vehicle 700 is located, as well as one or more actuators 736 configured to modify a position and/or orientation of the sensors. As shown, the sensors of the sensor system include a Global Positioning System (GPS) 726, an inertial measurement unit (IMU) 728, a RADAR unit 730, a laser rangefinder and/or LIDAR unit 732, and a camera 734. The sensor system 704 may include additional sensors as well, including, for example, sensors that monitor internal systems of the vehicle 700 (e.g., an $O_2$ monitor, a fuel gauge, an engine oil temperature, etc.). Other sensors are possible as well.

The GPS 726 may be any sensor configured to estimate a geographic location of the vehicle 700. To this end, the GPS 726 may include a transceiver configured to estimate a position of the vehicle 700 with respect to the Earth. The GPS 726 may take other forms as well.

The IMU 728 may be any combination of sensors configured to sense position and orientation changes of the vehicle 700 based on inertial acceleration. In some embodiments, the combination of sensors may include, for example, accelerometers and gyroscopes. Other combinations of sensors are possible as well.

The RADAR 730 unit may be any sensor configured to sense objects in the environment in which the vehicle 700 is located using radio signals. In some embodiments, in addition to sensing the objects, the RADAR unit 730 may additionally be configured to sense the speed and/or heading of the objects.

Similarly, the laser rangefinder or LIDAR unit 732 may be any sensor configured to sense objects in the environment in which the vehicle 700 is located using lasers. In particular, the laser rangefinder or LIDAR unit 732 may include a laser source and/or laser scanner configured to emit a laser and a detector configured to detect reflections of the laser. The laser rangefinder or LIDAR 732 may be configured to operate in a coherent (e.g., using heterodyne detection) or an incoherent detection mode.

The camera 734 may be any camera (e.g., a still camera, a video camera, etc.) configured to capture images of the environment in which the vehicle 700 is located. To this end, the camera may take any of the forms described above.

The sensor system 704 may additionally or alternatively include components other than those shown.

The control system 706 may be configured to control operation of the vehicle 700 and its components. To this end, the control system 706 may include a steering unit 738, a throttle 740, a brake unit 742, a sensor fusion algorithm 744, a computer vision system 746, a navigation or pathing system 748, and an obstacle avoidance system 750.

The steering unit 738 may be any combination of mechanisms configured to adjust the heading of vehicle 700.

The throttle 740 may be any combination of mechanisms configured to control the operating speed of the engine/motor 718 and, in turn, the speed of the vehicle 700.

The brake unit 742 may be any combination of mechanisms configured to decelerate the vehicle 700. For example, the brake unit 742 may use friction to slow the wheels/tires 724. As another example, the brake unit 742 may convert the kinetic energy of the wheels/tires 724 to electric current. The brake unit 742 may take other forms as well.

The sensor fusion algorithm 744 may be an algorithm (or a computer program product storing an algorithm) configured to accept data from the sensor system 704 as an input. The data may include, for example, data representing information sensed at the sensors of the sensor system 704. The sensor fusion algorithm 744 may include, for example, a Kalman filter, a Bayesian network, or another algorithm. The sensor fusion algorithm 744 may further be configured to provide various assessments based on the data from the sensor system 704, including, for example, evaluations of individual objects and/or features in the environment in which the vehicle 700 is located, evaluations of particular situations, and/or evaluations of possible impacts based on particular situations. Other assessments are possible as well.

The computer vision system 746 may be any system configured to process and analyze images captured by the camera 734 in order to identify objects and/or features in the environment in which the vehicle 700 is located, including, for example, traffic signals and obstacles. To this end, the computer vision system 746 may use an object recognition algorithm, a Structure from Motion (SFM) algorithm, video tracking, or other computer vision techniques. In some embodiments, the computer vision system 746 may additionally be configured to map the environment, track objects, estimate the speed of objects, etc.

The navigation and pathing system 748 may be any system configured to determine a driving path for the vehicle 700. The navigation and pathing system 748 may additionally be configured to update the driving path dynamically while the vehicle 700 is in operation. In some embodiments, the navigation and pathing system 748 may be configured to incorporate data from the sensor fusion algorithm 744, the GPS 726, and one or more predetermined maps so as to determine the driving path for vehicle 700.

The obstacle avoidance system 750 may be any system configured to identify, evaluate, and avoid or otherwise negotiate obstacles in the environment in which the vehicle 700 is located.

The control system 706 may additionally or alternatively include components other than those shown.

Peripherals 708 may be configured to allow the vehicle 700 to interact with external sensors, other vehicles, and/or a user. To this end, the peripherals 708 may include, for example, a wireless communication system 752, a touchscreen 754, a microphone 756, and/or a speaker 758.

The wireless communication system 752 may take any of the forms described above.

The touchscreen 754 may be used by a user to input commands to the vehicle 700. To this end, the touchscreen 754 may be configured to sense at least one of a position and a movement of a user's finger via capacitive sensing, resistance sensing, or a surface acoustic wave process, among other possibilities. The touchscreen 754 may be capable of sensing finger movement in a direction parallel or planar to the touchscreen surface, in a direction normal to the touchscreen surface, or both, and may also be capable of sensing a level of pressure applied to the touchscreen surface. The touchscreen 754 may be formed of one or more translucent or transparent insulating layers and one or more translucent or transparent conducting layers. The touchscreen 754 may take other forms as well.

The microphone 756 may be configured to receive audio (e.g., a voice command or other audio input) from a user of the vehicle 700. Similarly, the speakers 758 may be configured to output audio to the user of the vehicle 700.

The peripherals 708 may additionally or alternatively include components other than those shown.

The computer system 710 may be configured to transmit data to and receive data from one or more of the propulsion system 702, the sensor system 704, the control system 706, and the peripherals 708. To this end, the computer system 710 may be communicatively linked to one or more of the propulsion system 702, the sensor system 704, the control system 706, and the peripherals 708 by a system bus, network, and/or other connection mechanism (not shown).

The computer system 710 may be further configured to interact with and control one or more components of the propulsion system 702, the sensor system 704, the control system 706, and/or the peripherals 708. For example, the computer system 710 may be configured to control operation of the transmission 722 to improve fuel efficiency. As another example, the computer system 710 may be configured to cause the camera 734 to capture images of the environment. As yet another example, the computer system 710 may be configured to store and execute instructions corresponding to the sensor fusion algorithm 744. As still another example, the computer system 710 may be configured to store and execute instructions for displaying a display on the touchscreen 754. Other examples are possible as well.

As shown, the computer system 710 includes the processor 712 and data storage 714. The processor 712 may comprise one or more general-purpose processors and/or one or more special-purpose processors. To the extent the processor 712 includes more than one processor, such processors could work separately or in combination. Data storage 714, in turn, may comprise one or more volatile and/or one or more non-volatile storage components, such as optical, magnetic, and/or organic storage, and data storage 714 may be integrated in whole or in part with the processor 712.

In some embodiments, data storage 714 may contain instructions 716 (e.g., program logic) executable by the processor 712 to execute various vehicle functions, including those described above in connection with FIG. 1. Further, data storage 714 may contain constraints 762 for the vehicle 700, which may take any of the forms described above. Data storage 714 may contain additional instructions as well, including instructions to transmit data to, receive data from, interact with, and/or control one or more of the propulsion system 702, the sensor system 704, the control system 706, and the peripherals 708.

The computer system 702 may additionally or alternatively include components other than those shown.

As shown, the vehicle 700 further includes a power supply 760, which may be configured to provide power to some or all of the components of the vehicle 700. To this end, the power supply 760 may include, for example, a rechargeable lithium-ion or lead-acid battery. In some embodiments, one or more banks of batteries could be configured to provide electrical power. Other power supply materials and configurations are possible as well. In some embodiments, the power supply 760 and energy source 720 may be implemented together, as in some all-electric cars.

In some embodiments, one or more of the propulsion system 702, the sensor system 704, the control system 706, and the peripherals 708 could be configured to work in an interconnected fashion with other components within and/or outside their respective systems.

Further, the vehicle 700 may include one or more elements in addition to or instead of those shown. For example, the vehicle 700 may include one or more additional interfaces and/or power supplies. Other additional components are possible as well. In such embodiments, data storage 714 may further include instructions executable by the processor 712 to control and/or communicate with the additional components.

Still further, while each of the components and systems are shown to be integrated in the vehicle 700, in some embodiments, one or more components or systems may be removably mounted on or otherwise connected (mechanically or electrically) to the vehicle 700 using wired or wireless connections.

The vehicle 700 may take other forms as well.

Figure 8:
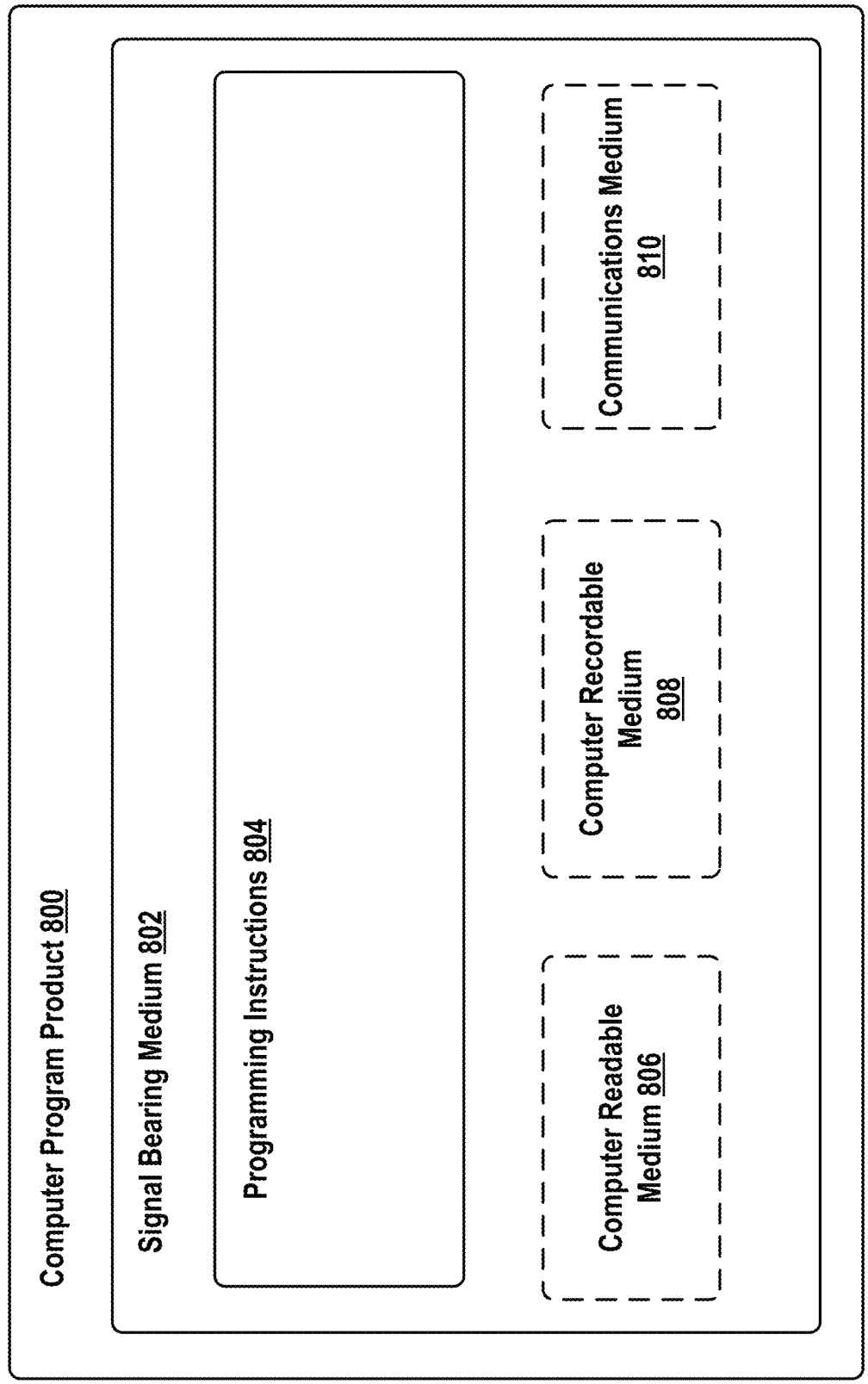
FIG. 8 is a simplified block diagram of an example computer program product, in accordance with an embodiment.

In some embodiments, the disclosed methods may be implemented as computer program instructions encoded on a non-transitory computer-readable storage media in a machine-readable format, or on other non-transitory media or articles of manufacture. FIG. 8 is a schematic illustrating a conceptual partial view of an example computer program product 800 that includes a computer program for executing a computer process on a computing device, arranged according to at least some embodiments presented herein.

In one embodiment, the example computer program product 800 is provided using a signal bearing medium 802. The signal bearing medium 802 may include one or more programming instructions 804 that, when executed by one or more processors, may provide functionality or portions of the functionality described above with respect to FIGS. 1-5B.

In some embodiments, the signal bearing medium 802 may encompass a computer-readable medium 806, such as, but not limited to, a hard disk drive, a Compact Disc (CD), a Digital Video Disk (DVD), a digital tape, memory, etc. Further, in some embodiments the signal bearing medium 802 may encompass a computer recordable medium 808, such as, but not limited to, memory, read/write (R/W) CDs, R/W DVDs, etc. Still further, in some embodiments the signal bearing medium 802 may encompass a communications medium 810, such as, but not limited to, a digital and/or an analog communication medium (e.g., a fiber optic cable, a waveguide, a wired communications link, a wireless communication link, etc.). Thus, for example, the signal bearing medium 802 may be conveyed by a wireless form of the communications medium 810.

The one or more programming instructions 804 may be, for example, computer executable and/or logic implemented instructions. In some examples, a computing device (e.g., the computer system 710 of FIG. 7) may be configured to provide various operations, functions, or actions in response to the programming instructions 804 being conveyed to the computing device by one or more of the computer readable medium 806, the computer recordable medium 808, and/or the communications medium 810.

The non-transitory computer readable medium may also be distributed among multiple data storage elements, which could be remotely located from each other.

In some embodiments, the computing device that executes some or all of the programming instructions 804 could be a vehicle, such as the vehicle 700 illustrated in FIG. 7. Other computing devices are possible as well.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A system for a vehicle, comprising:
a sensor configured to sense information about an environment of the vehicle in a field of view of the sensor;
an additional sensor; and
a processor in the vehicle configured to (i) analyze the sensed information from the sensor to detect a plurality of obstacles in the environment of the vehicle, (ii) determine that the field of view of the sensor is obscured by at least one detected obstacle, thereby inhibiting the sensor to sense information about a portion of the environment of the vehicle, and (iii) responsive to determining by the processor that the field of view of the sensor is obscured, obtain, by the processor, information from the additional sensor, wherein the additional sensor is able to sense information about the portion of the environment.

2. The system of claim 1, wherein the sensor is a camera, and wherein the processor is configured to analyze images captured by the camera to detect obstacles.

3. The system of claim 1, wherein the processor is further configured to determine a requested field of view and to send to the additional sensor a request to sense information in the requested field of view.

4. The system of claim 3, wherein the requested field of view is less obscured by the at least one detected obstacle than the field of view of the sensor.

5. The system of claim 1, wherein the processor is further configured to modify the field of view of the sensor.

6. The system of claim 1, wherein the vehicle is an autonomous vehicle.

7. A method, comprising:
analyzing, by a processor in a vehicle, information sensed by a sensor to detect a plurality of obstacles in an environment of the vehicle, wherein the sensor is configured to sense information about the environment of the vehicle in a field of view of the sensor;
determining, by the processor, that the field of view of the sensor is obscured by at least one detected obstacle, thereby inhibiting the sensor to sense information about a portion of the environment of the vehicle; and
responsive to determining by the processor that the field of view of the sensor is obscured, obtaining, by the processor, information from an additional sensor, wherein the additional sensor is able to sense information about the portion of the environment.

8. The method of claim 7, wherein the sensor is a camera, and wherein analyzing information by the sensor comprises analyzing images captured by the camera.

9. The method of claim 7, further comprising:
determining, by the processor, a requested field of view; and
sending to the additional sensor a request to sense information in the requested field of view.

10. The method of claim 9, wherein the requested field of view is less obscured by the at least one detected obstacle than the field of view of the sensor.

11. The method of claim 7, further comprising:
modifying the field of view of the sensor.

12. The method of claim 7, wherein the vehicle is an autonomous vehicle.

13. A non-transitory computer-readable medium having stored therein instructions executable by a computing device to cause the computing device to perform operations, wherein the operations comprise:
analyzing, by a processor in a vehicle, information sensed by a sensor to detect a plurality of obstacles in an environment of the vehicle, wherein the sensor is configured to sense information about the environment of the vehicle in a field of view of the sensor;
determining, by the processor, that the field of view of the sensor is obscured by at least one detected obstacle, thereby inhibiting the sensor to sense information about a portion of the environment of the vehicle; and
responsive to determining by the processor that the field of view of the sensor is obscured, obtaining, by the processor, information from an additional sensor, wherein the additional sensor is able to sense information about the portion of the environment.

14. The non-transitory computer-readable medium of claim 13, wherein the sensor is a camera, and wherein analyzing information by the sensor comprises analyzing images captured by the camera.

15. The non-transitory computer-readable medium of claim 13, wherein the operations further comprise:
determining a requested field of view; and
sending to the additional sensor a request to sense information in the requested field of view.

16. The non-transitory computer-readable medium of claim 15, wherein the requested field of view is less obscured by the at least one detected obstacle than the field of view of the sensor.

17. The non-transitory computer-readable medium of claim 13, wherein the operations further comprise:
modifying the field of view of the sensor.

* * * * *